INVENTOR.
EARL J. HORRELL
BY
ATTORNEY

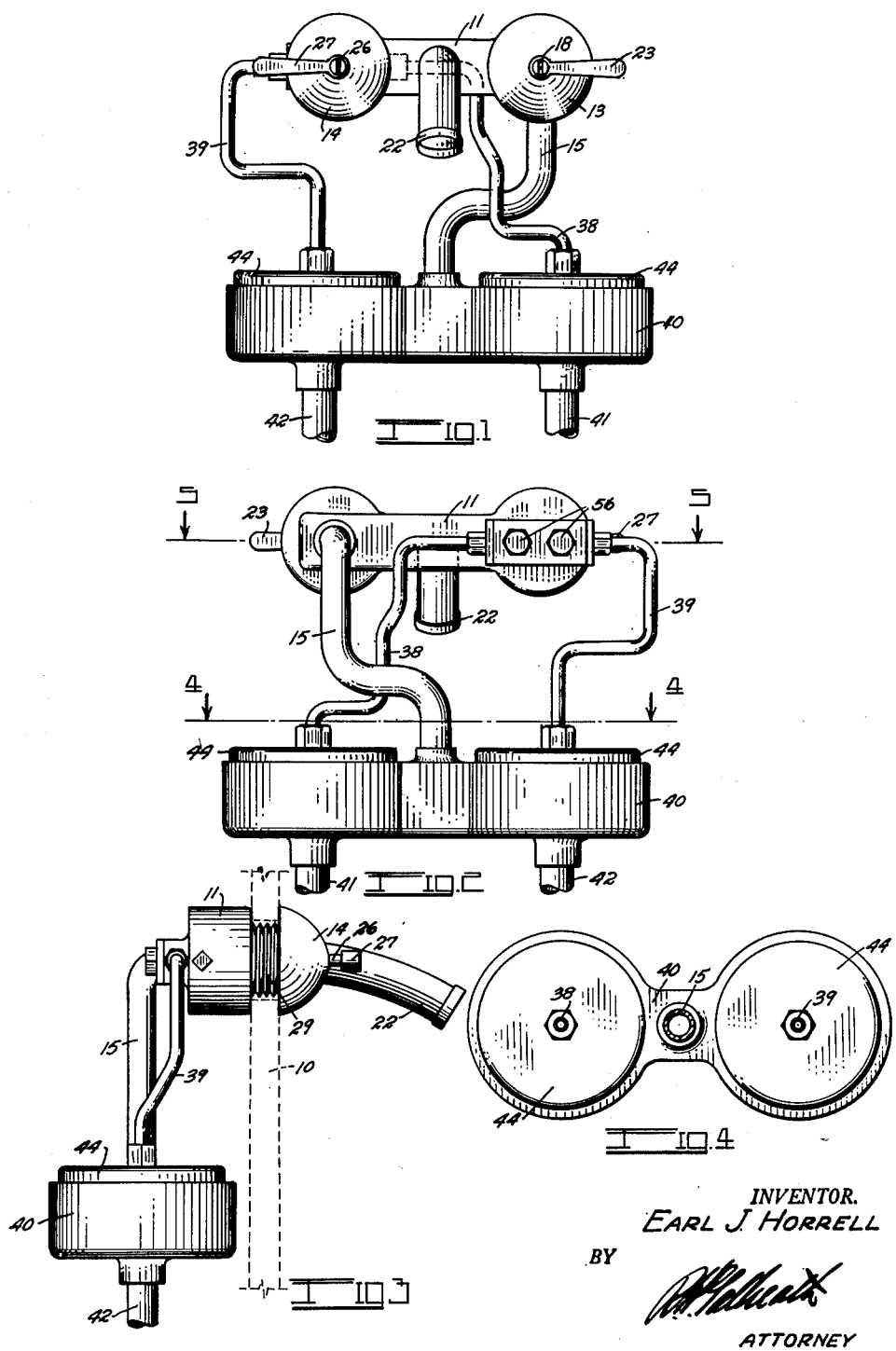

Patented Feb. 24, 1953

2,629,400

UNITED STATES PATENT OFFICE 2,629,400

WATER TEMPERATURE CONTROL VALVE

Earl J. Horrell, Denver, Colo.

Application September 10, 1949, Serial No. 115,008

1 Claim. (Cl. 137—607)

This invention relates to a fluid temperature control valve, more particularly to the type of valve used in shower baths and the like for controlling the temperature of the water.

The principal object of the invention is to provide a simple and highly efficient mechanism whereby an accurate control of the water temperature may be had at all times regardless of variations in pressure in the hot and cold water sources.

Another object of the invention is to so construct the device that the temperature control mechanism may be positioned at a point remote from the flow control valve and so that a single temperature control may be used to control the temperature at a plurality of separated outlets.

Other objects and advantages reside in the detail construction of the invention, which is designed for simplicity, economy, and efficiency. These will become more apparent from the following description.

In the following detailed description of the invention, reference is had to the accompanying drawing which forms a part hereof. Like numerals refer to like parts in all views of the drawing and throughout the description.

Fig. 1 is a front view of the assembled temperature control and flow control valves;

Fig. 2 is a horizontal section through the temperature control mechanism, taken on the line 2—2, Fig. 1;

Fig. 3 is a similar horizontal section, through the flow control valves, taken on the line 3—3, Fig. 1;

Fig. 4 is a detail cross-section, taken on the line 4—4, Fig. 2.

Figure 5:
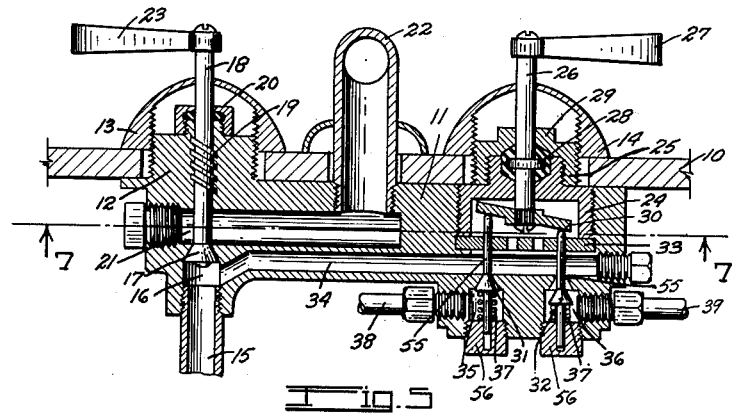
Fig. 5 is an enlarged longitudinal section looking downwardly on the line 5—5, Fig. 2.
Figure 6:
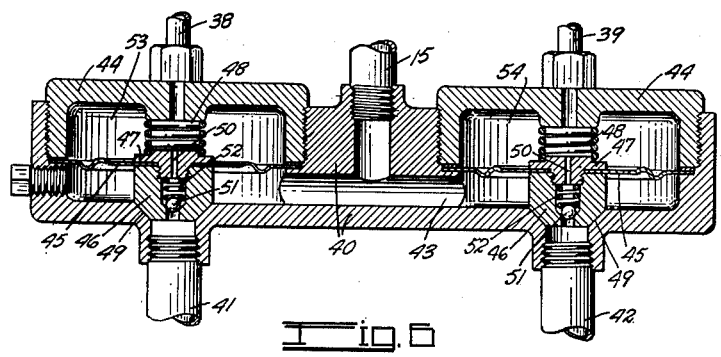
Fig. 6 is a similar section through a valve housing employed in the improved valve taken on the horizontal center line of Fig. 5.
Figure 7:
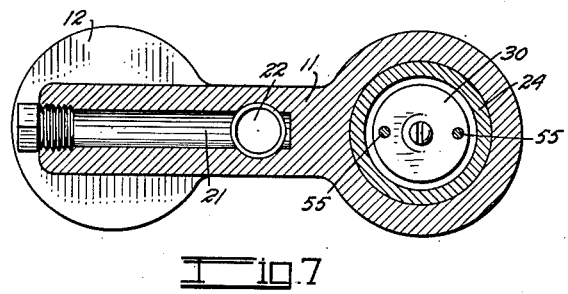
Fig. 7 is a similar section taken on the line 7—7, Fig. 5.

While the invention is more particularly designed for use in shower baths or the like, it is, of course, not limited to this particular use, as it will be found valuable wherever it is desired to proportionately intermix two fluids. The invention is illustrated, however, as applied to a shower bath outlet and is designed to be mounted upon a supporting wall, as indicated at 10.

The invention consists of two portions, a manual temperature control portion and an automatic flow control portion. The manual control portion operates the automatic control portion hydraulically. The two portions may be incorporated in a single unit or may consist of two separate units located in spaced-apart relation.

As illustrated, the manual temperature control portion consists of a housing block 11 adapted to be placed against the rear face of the wall 10. A threaded boss 12 extends through the wall 10 from adjacent one extremity of the block 11, and a mounting cap 13 is threaded on the boss 12 to clamp against the forward face of the wall 10. A similar mounting cap 14 is attached adjacent the other extremity of the block 11, as will be later described. The caps 13 and 14 support the block 11 rigidly in place on the back of the wall 10. A discharge spout 22 extends through the wall 10 from the block 11.

Proportioned water is supplied to the block 11 through a supply conduit 15 communicating within a valve cavity 16 in the block. The volume of water flowing from the valve cavity 16 is controlled by means of a volume valve 17 mounted on a valve stem 18 terminating in a volume control handle 23. The stem 18 is provided with relatively coarse threads 19 which are threaded into the boss 12, as is usual in faucet construction. A packing nut 20 seals the valve stem 18 to the boss 12. The water discharging through the valve 17 enters a discharge passage 21, which terminates in the discharge spout 22.

A cylindrical valve cage 24 is threaded into the other extremity of the housing 11 and provided with a threaded boss 25 through which a temperature control valve stem 26 passes. The temperature control valve stem 26 terminates in a suitable operating handle 27. A sealing flange 28 is formed on the stem 26 and is held in place by means of a suitable sealing nipple 29. The nipple 29 is threaded to receive the mounting cap 14.

A wobble disc cam 30 is mounted on the inner extremity of the stem 26 within the cage 24. The surface of the cam 30 acts against stems 55 of a hot water tappet valve 31 and a cold water tappet valve 32. The stems 55 of the valves 31 and 32 extend through a perforated guide plate 33 into the cage 24. The valves admit fluid to a fluid passage 34 in the housing 11. The passage 34 communicates with the valve cavity 16. Access may be had to the valves 31 and 32 through the medium of removable plugs 56.

The valve 31 controls the discharge of water from a hot water chamber 35 and the valve 32 controls the discharge of water from a cold water chamber 36. Both valves are constantly urged against the cam 30 by means of compression springs 37. The hot water is conducted to the hot water chamber 35 by means of a hot water tube 38 and cold water is conducted to the cold water chamber 36 by means of a cold water tube 39. The tubes 38 and 39 and the supply tube 15 lead to the automatic flow control portion of the device.

The automatic flow control portion comprises a valve housing 40 to which hot and cold water pipes 41 and 42 respectively lead. The interior of the housing 40 contains a mixed water passage 43 from which the supply conduit 15 leads.

The control mechanisms for both the hot and cold water supplies are similar and each consists of a hollow diaphragm cap 44 threaded into the housing 40 against a flexible diaphragm 45 to form diaphragm chambers 53 and 54. Each diaphragm 45 carries a plug valve 46 attached thereto by means of a clamping nut 47. A compression spring 48 urges the plug valve 46 against a valve seat 49 to close off the water supply. A by-pass passage 50 extends through the nut 47 into the valve plug 46 terminating in a ball check valve 51 therein. A valve spring 52 urges the ball check valve against its seat to prevent return flow through the valve plug 46.

In use, the handle 23 is turned to the position to deliver the desired amount of water. The temperature handle 27 is then turned to open one or both of the tappet valves 31 and 32. This allows water to flow from the chambers 53 and 54 so as to reduce the pressure therein so as to permit the pressure in the hot and cold water pipes 41 and 42 to force the valves 46 from their seats so that both hot and cold water will flow into the passage 43 and from the discharge spout 22. Should additional hot water be desired, the handle 27 is turned to open the valve 31 further and to slightly close the valve 32. This reduces the pressure in the hot water diaphragm chamber 53 and increases the pressure in the cold water diaphragm chamber 54 so as to cause the plug valve 46 on the hot water line to move further away from its seat and the plug valve 46 on the cold water line to approach its seat.

The pressure to the diaphragm chambers 53 and 54 is supplied through the by-pass passage 50. Since the passage 50, however, is relatively small, it cannot build the pressure in the chamber 53 unless the valves 31 and 32 are closed to pass less water than can flow through the by-pass passage. If both the valves 31 and 32 are closed, the pressure building up through the by-pass passage 50 will close both the valves 46. Thus proportionate control is had at all times between the valves 31 and 32 and the valves 46.

While a specific form of the improvement has been described and illustrated herein, it is to be understood that the same may be varied, within the scope of the appended claim, without departing from the spirit of the invention.

Having thus described the invention, what is claimed and desired secured by Letters Patent is:

A temperature control valve comprising: a housing; a water passage in said housing; a hot water port opening to said passage; a cold water port opening to said passage; a pressure-operated diaphragm forming a portion of the wall of said passage, there being one diaphragm positioned opposite each port; a plug valve mounted on each diaphragm and closing the port opposite the diaphragm so that pressure in said passage will act to flex said diaphragm and open said valves; a pressure chamber on the opposite side of each diaphragm in which pressure will act to close said valves; a by-pass passage by-passing each plug valve to supply fluid pressure to each pressure chamber; an independent valve in each of said passages; a conduit communicating with the water passage in said housing; a first tube extending from one of said pressure chambers; a second tube extending from the other of said pressure chambers; a tappet valve positioned in the line of flow from each of said tubes to said conduit; and a single means for operating both tappet valves oppositely and simultaneously.

EARL J. HORRELL.

REFERENCES CITED

The following references are of record in the file of this patent:

UNITED STATES PATENTS

| Number | Name | Date |
| --- | --- | --- |
| 1,095,003 | Leonard | Apr. 28, 1914 |
| 1,869,663 | Cartier | Aug. 2, 1932 |
| 1,988,957 | Newell | Jan. 22, 1935 |
| 2,211,237 | Langdon | Aug. 13, 1940 |
| 2,217,842 | Lamar | Oct. 15, 1940 |

FOREIGN PATENTS

| Number | Country | Date |
| --- | --- | --- |
| 12,336 | Great Britain | of 1903 |